(12) United States Patent
Kuhn et al.

(10) Patent No.: US 8,219,437 B2
(45) Date of Patent: Jul. 10, 2012

(54) METHODS AND SYSTEMS FOR CONSTRUCTING PRODUCTION PLANS

(75) Inventors: Lukas Daniel Kuhn, Palo Alto, CA (US); Robert Price, Palo Alto, CA (US); Johan de Kleer, Los Altos, CA (US); Minh Binh Do, Mountain View, CA (US); Rong Zhou, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 876 days.

(21) Appl. No.: 12/170,577

(22) Filed: Jul. 10, 2008

(65) Prior Publication Data

US 2010/0010845 A1 Jan. 14, 2010

(51) Int. Cl.
- G06Q 10/00 (2006.01)
- G06F 19/00 (2006.01)
- G06F 11/00 (2006.01)
- G06F 9/44 (2006.01)

(52) U.S. Cl. ............ 705/7.23; 705/7.36; 705/7.12; 700/110; 700/97; 714/25; 714/26; 706/52

(58) Field of Classification Search ............ 705/7.36, 705/7.23, 7.12; 700/110, 97; 714/25, 26; 706/52

See application file for complete search history.

(56) References Cited

U.S. PATENT DOCUMENTS

| | | |
|---|---|---|
| 4,563,746 A | 1/1986 | Yoshida et al. |
| 5,006,992 A | 4/1991 | Sheirik |
| 5,023,045 A | 6/1991 | Watanabe et al. |
| 5,070,468 A | 12/1991 | Niinomi et al. |
| 5,127,005 A * | 6/1992 | Oda et al. ............ 714/26 |
| 5,214,577 A | 5/1993 | Sztipanovits et al. |
| 5,268,834 A | 12/1993 | Sanner et al. |
| 5,305,426 A | 4/1994 | Ushioda et al. |
| 5,315,502 A | 5/1994 | Koyama et al. |
| 5,486,995 A | 1/1996 | Krist et al. |
| 5,521,814 A | 5/1996 | Teran et al. |
| 5,581,459 A | 12/1996 | Hori et al. |
| 5,586,021 A * | 12/1996 | Fargher et al. ............ 705/7.12 |
| 5,701,395 A | 12/1997 | Arita et al. |
| 5,748,496 A | 5/1998 | Takahashi et al. |
| 5,914,875 A | 6/1999 | Monta et al. |
| 6,012,152 A | 1/2000 | Douik et al. |
| 6,038,540 A | 3/2000 | Krist et al. |
| 6,113,256 A | 9/2000 | Bonissone et al. |
| 6,263,277 B1 * | 7/2001 | Tanimoto et al. ............ 701/209 |
| 6,272,483 B1 | 8/2001 | Joslin et al. |
| 6,326,758 B1 * | 12/2001 | Discenzo ............ 318/609 |

(Continued)

OTHER PUBLICATIONS

Do, "Partial Satisfaction (Over-Subscription) Planning as Heuristic Search," 2004, Proceedings of KBCS-04.*

(Continued)

*Primary Examiner* — Justin M Pats
*Assistant Examiner* — Ivan R Goldberg
(74) *Attorney, Agent, or Firm* — Fay Sharpe LLP

(57) ABSTRACT

Systems and methods are presented for constructing production plans to achieve one or more production goals, in which a diagnosis engine determines the production plant condition based on a previously executed plan, observations from the plant, and a plant model, and formulates a heuristic based on a diagnostic objective, and with a planner to performing a partial-plan search using the heuristic to construct the plans that will concurrently achieve at least one production goal and facilitate the diagnostic objective.

20 Claims, 6 Drawing Sheets

U.S. PATENT DOCUMENTS

| | | | |
|---|---|---|---|
| 6,411,908 B1 | 6/2002 | Talbott | |
| 6,415,276 B1 | 7/2002 | Heger et al. | |
| 6,560,552 B2* | 5/2003 | Shen et al. | 702/56 |
| 6,643,592 B1* | 11/2003 | Loman et al. | 702/35 |
| 6,651,048 B1* | 11/2003 | Agrawal et al. | 1/1 |
| 6,725,208 B1 | 4/2004 | Hartman et al. | |
| 6,735,549 B2 | 5/2004 | Ridolfo | |
| 6,764,267 B2 | 7/2004 | Hart et al. | |
| 6,795,798 B2 | 9/2004 | Eryurek et al. | |
| 6,795,799 B2 | 9/2004 | Deb et al. | |
| 6,847,854 B2* | 1/2005 | Discenzo | 705/7.12 |
| 6,853,930 B2 | 2/2005 | Hayashi et al. | |
| 6,879,973 B2* | 4/2005 | Skaanning et al. | 706/52 |
| 6,895,292 B2* | 5/2005 | Fromherz et al. | 700/101 |
| 6,898,475 B1 | 5/2005 | Ruml et al. | |
| 6,907,381 B2 | 6/2005 | Hayashi et al. | |
| 6,925,338 B2 | 8/2005 | Eryurek et al. | |
| 6,947,797 B2 | 9/2005 | Dean et al. | |
| 6,965,806 B2 | 11/2005 | Eryurek et al. | |
| 6,965,887 B2 | 11/2005 | Huelsman et al. | |
| 7,043,321 B2 | 5/2006 | Ruml et al. | |
| 7,062,478 B1 | 6/2006 | Huelsman et al. | |
| 7,139,629 B2 | 11/2006 | Fromherz et al. | |
| 7,162,393 B1 | 1/2007 | Vacar et al. | |
| 7,164,954 B2 | 1/2007 | Lefebvre et al. | |
| 7,206,771 B2 | 4/2007 | Alvarez et al. | |
| 7,216,018 B2 | 5/2007 | Zuo et al. | |
| 7,230,736 B2 | 6/2007 | Fromherz et al. | |
| 7,233,405 B2 | 6/2007 | Fromherz | |
| 7,346,404 B2 | 3/2008 | Eryurek et al. | |
| 7,356,383 B2 | 4/2008 | Pechtl et al. | |
| 7,433,743 B2 | 10/2008 | Pistikopoulos et al. | |
| 7,451,003 B2 | 11/2008 | Chester et al. | |
| 7,467,841 B2 | 12/2008 | Kamisuwa et al. | |
| 7,469,185 B2 | 12/2008 | Mendrick et al. | |
| 7,574,334 B2 | 8/2009 | Tiwari et al. | |
| 7,689,309 B2 | 3/2010 | Zheng | |
| 7,711,674 B2 | 5/2010 | Arthur et al. | |
| 7,725,857 B2 | 5/2010 | Foltz et al. | |
| 7,903,844 B2 | 3/2011 | Satonaga et al. | |
| 7,937,175 B2 | 5/2011 | de Kleer et al. | |
| 2002/0184176 A1* | 12/2002 | Fromherz et al. | 706/45 |
| 2004/0002776 A1 | 1/2004 | Bickford | |
| 2004/0088207 A1 | 5/2004 | Fromherz | |
| 2006/0064291 A1 | 3/2006 | Pattipatti et al. | |
| 2006/0230313 A1 | 10/2006 | Grichnik et al. | |
| 2007/0043607 A1* | 2/2007 | Howard et al. | 705/10 |
| 2007/0129834 A1* | 6/2007 | Howard et al. | 700/103 |
| 2008/0010230 A1 | 1/2008 | Smith et al. | |
| 2008/0010522 A1* | 1/2008 | Uwatoko et al. | 714/23 |
| 2008/0039969 A1 | 2/2008 | Liu et al. | |
| 2008/0062211 A1 | 3/2008 | Kamisuwa et al. | |
| 2008/0071716 A1* | 3/2008 | Anderson et al. | 706/45 |
| 2008/0148257 A1 | 6/2008 | Ruml et al. | |
| 2008/0215509 A1 | 9/2008 | Charlton | |
| 2009/0043809 A1 | 2/2009 | Fakhouri et al. | |
| 2009/0183777 A1 | 7/2009 | Herman et al. | |
| 2009/0204234 A1 | 8/2009 | Sustaeta et al. | |
| 2009/0204237 A1 | 8/2009 | Sustaeta et al. | |
| 2009/0204245 A1 | 8/2009 | Sustaeta et al. | |
| 2009/0204267 A1 | 8/2009 | Sustaeta et al. | |
| 2009/0210081 A1 | 8/2009 | Sustaeta et al. | |
| 2009/0228408 A1 | 9/2009 | Kaushal et al. | |
| 2009/0240366 A1 | 9/2009 | Kaushal et al. | |
| 2009/0265025 A1 | 10/2009 | Brown | |
| 2010/0010654 A1 | 1/2010 | de Kleer et al. | |
| 2010/0138026 A1 | 6/2010 | Kaushal et al. | |
| 2010/0222897 A1 | 9/2010 | Qiao et al. | |

OTHER PUBLICATIONS de Kleer, "Diagnosing Multiple Faults," 1987, Artificial Intelligence, vol. 32, pp. 97-130.*

Hamscher, "Issues in Model Based Troubleshooting," 1987, MIT A.I. Lab Memo 893.*

Wu, "Scheduling with uncertain durations: generating β-robust schedules using constraint programming," ICAPS 2006 Workshop on Constraint Satisfaction Techniques for Planning and Scheduling Problems, pp. 134-137.*

Do, "Sapa: A Scalable Multi-objective Heuristic Metric Temporal Planner," 2003, Journal of Artificial Intelligence Research, pp. 155-194.*

Do, "Improving the Temporal Flexibility of Position Constrained Metric Temporal Plans," 2003, Proceedings of ICAPS '03, pp. 42-51.* de Kleer, "Fundamentals of Model-Based Diagnosis," 2003, Proceedings of the 5th IFAC Symposium on Fault Detection, Supervision, and Safety of Technical Processes, pp. 25-36.* van den Briel, "Effective Approaches for Partial Satisfaction (Over-Subscription) Planning," 2004, In Nineteenth National Conference on Artificial Intelligence (AAAI), pp. 562-569.*

Bacchus, "Graphical models for preference and utility," 1995, In Proceedings of UAI.*

Smith, "Choosing Objectives in Over-Subscription Planning," 2004, Proceedings of ICAPS-04, pp. 393-401.*

Hoffman, "FF: The fast-forward planning system," 2001, AI Magazine, vol. 22, No. 3, pp. 57-62.*

Provan, "Model-Based Diagnosis and Control Reconfiguration for Discrete Event Systems : An Integrated Approach," 1999, Proceedings of the 38th Conference on Decision & Control, pp. 1762-1768.*

Ruml, "On-line Planning and Scheduling for High-speed Manufacturing," 2005, ICAPS, pp. 30-39.*

Verron, "A New Procedure Based on Mutual Information for Fault Diagnosis of Industrial Systems, published in " Workshop on Advanced Control and Diagnosis, 2006.*

Kumar Thittamaranahalli, "Contributions to Algorithmic Techniques in Automated Reasoning About Physical System," Mar. 2005, Stanford University, Department of Computer Science.*

Vahidi, "Generic Resource Booking Models in Flexible Cells", Proceedings of the 2001 IEEE International Symposium on Intelligent Control, pp. 252-257.*

EP Search report EP 09 16 4977, Sep. 25, 2009.*

Kuhn, "Heuristic Search for Target-Value Path Problem," Palo Alto Research Center, 2008.*

European Search Report, EP 09 16 4978, Sep. 16, 2009.

European Search Report, EP 10 15 6820, Jul. 8, 2010.

Nykanen, Matt et al; Finding Paths with the Right Cost:; 1999; Springer-Verlag Berlin Heidelberg; STACS '99-Lecture Notes in Computer Science, vol. 1563/1999; pp. 345-355.

Nykanen, Matt et al.; "The Exact Path Length Problem"; Elsevier Science; Journal of Algorithms 42; pp. 41-53, Jan. 2002.

Faloutos, Chistos et al.; "Fast Discovery of Connection Subgraphs"; 2004; ACM; KDD'04; pp. 118-127.

Ramakrishnan, Cartic et al.; "Discovering Informative Connection Subgraphs in Multi-relational Graphs"; 2005; ACM New York, NY; ACM SIGKDD Explorations Newsletter, vol. 7, Issue 2; pp. 56-63.

Faloutos, Christos et al.; "Connection Subgraphs in Social Networks"; 2004; Proceeding of the Workshop on Link Analysis, Counterterrorism, and Privacy (in conj. wtih SIAM International Conference on Data Mining): 12 pages.

Minh Do and Wheeler Ruml, "Lessons Learned in Applying Domain-Independent Planning to High-Speed Manufacturing", Palo Alto Research Center, 2006.

Richard Dearden and Dan Clancy, "Particle Filters for Real-Time Fault Detection in Planetary Rovers", Research Institute for Advanced Computer Science, NASA Ames Research Center, 2002, in Proc. 13 Int. Workshop DX, pp. 1-6.

Patrick Haslum and Hector Geffner, "Heuristic Planning with Time and Resources", Department of Computer Science, Linkoping University, Sweden, Departamento de Computacion, Universidad Simon Bolivar, Venezuela, 2001, in Proceedings of ECP-01, pp. 121-132.

Markus P.J. Fromherz, Daniel G. Bobrow, and Johan De Kleer, "Model-based Computing for Design and Control of Reconfigurable Systems", Palo Alto Research Center, Published in AI Magazine, Special Issue on Qualitative Reasoning, vol. 24, n. 4, 2003 pp. 120-130.

Roberto Cervoni, Amedeo Cesta, and Angelo Oddi, "Managing Dynamic Temporal Constraint Networks", National Research Council of Italy, 1994, Proc. of AIPS.

Rina Dechter and Judea Pearl, "Generalized Best-First Search Strategies and the Optimality of A", University of California, Los Angeles, California, Journal of the Association for Computing Machinery, vol. 32, No. 3, Jul. 1985, pp. 505-536.

Peter E. Hart, Nils J. Nilsson, and Bertram Raphael, "A Formal Basis for the Heuristic Determination of Minimum Cost Paths", IEEE Transactions of Systems Science and Cybernetics, vol. ssc-4, No. 2, Jul. 1968.

Arora, R; and Hsiao, M.S., "Enhancing SAT-based Bounded Model Checking Using Sequential Logic Implications", Aug. 2004, 17th Intl Conference on VLSI Design, ISBN 0-765-2072-3, IEEE Xplore Digital Library.

Basu, S. and Kumar, R., "Quotient-Based Control Synthesis for Partially Observed Non-Deterministic Plants with Mu-calculus Specifications", Dec. 2007, Proceedings of the 46th IEEE Conference on Decision and Control, ISBN 1-4244-1498-9, IEE Xplore Digital Library.

Darwiche, A., "Decomposable Negation Normal Form", Jul. 2001, Journal of the ACM, vol. 48, No. 4, pp. 608-647.

Deng, S.; Bian, J.; Wu, W.; Yanx, X.; and Zhao, Y., "EHSAT: An Efficient RTL Satisfiablility Solver Using an Extended DPLL Procedure", Jun. 2007, Design Automation Conference 2007, ACM online.

Elliot, P., "An Efficient Projected Minimal Conflict Generator for Projected Prime Implication Generation", Feb. 2004, Massachusetts Institute of Technology, Department of Aeronautics and Astronautics.

Gopalakrisnan, S; Durairaj, V. and Kalla, P. "Integrating CNF and BDD Based SAT Solver", Nov. 2003IEEE Intl High-Level Design Validation and Test Workshop, ISBN 07803-8236-6, IEEE Xplore Digital Library.

Thittamaranahalli, S.K., "Contributions to Algorithmic Techniques in Automated Reasoning About Physical Systems", Mar. 2005, Stanford University, Department of Computer Science.

Voronov, A. and Akesson, K., "Supervisory Control Using Satisfiability Solvers", May 2008, Proceedings of the 9th Intl Workshop on Discrete Event Systems, ISBN 1-4244-2593-8, IEEE Xplore Digital Library.

EP Search Report, EP 09 16 4977, Sep. 25, 2009.

Lukas Kuhn, Tim Schmidt, Bob Price, Johan De Kleer, Rong Zhou and Minh Do, "Heuristic Search for Target-Value Path Problem", Palo Alto Research Center, 2008.

Patrick Haslum and Hector Geffner, "Heuristic Planning with Time and Resources", Department of Computer Science, Linkoping University, Sweden, Departmento de Computacion, Universidad Simon Bolivar, Venezuela. 2001, in Proceedings of ECP-01, pp. 121-132.

Markus P.J. Fromherz, Daniel G. Bobrow, and Johan De Kleer, "Model-based computing for Design Control of Reconfigurable Systems", Palo Alto Research Center, Published in AL Magazine, Special Issue on Qualitative Reasoning, vol. 24, n. 4, 2003 pp. 120-130.

Roberto Cervoni, Amedeo Cesta, An Angelo Oddi, "Managing Dynamic Temporal Constraint Networks", National Research Council of Italy, 1994, Proc. of AIPS.

Rina Dechter and Juea Pearl, "Generalized Best-First Search Strategies and the Optimality of A", University of California, Los Angeles, California, Journal of the Association for Computing Machinery, vol. 32, No. 3, Jul. 1985, pp. 505-536.

* cited by examiner

METHODS AND SYSTEMS FOR CONSTRUCTING PRODUCTION PLANS

BACKGROUND

The present exemplary embodiments relate to automated diagnosis and production in systems having multiple resources for achieving production goals. In such systems, automated diagnosis of system performance and component status can advantageously aid in improving productivity, identifying faulty or underperforming resources, scheduling repair or maintenance, etc. Accurate diagnostics requires information about the true condition of components in the production system. Such information can be obtained directly from sensors associated with individual components and/or may be inferred from a limited number of sensor readings within the production plant using a model or other knowledge of the system structure and dynamics. Providing complete sensor coverage for all possible system faults can be expensive or impractical in harsh production environments, and thus it is generally preferable to instead employ diagnostic procedures to infer the source of faults detected or suspected from limited sensors. System diagnostic information is typically gathered by one of two methods, including dedicated or explicit diagnostics with the system being exercised while holding production to perform tests and record observations without attaining any production, as well as passive diagnostics in which information is gathered from the system sensors during normal production. Although the latter technique allows inference of some information without disrupting production, the regular production mode may not sufficiently exercise the system to provide adequate diagnostic information to improve long term productivity. Moreover, while dedicated diagnostic operation generally provides better information than passive diagnostics, the cost of this information is high in terms of short term productivity reduction, particularly when diagnosing recurring intermittent system component failures that require repeated diagnostic interventions. Conventional production system diagnostics are thus largely unable to adequately yield useful diagnostic information without halting production and incurring the associated costs of system down-time, and are therefore of limited utility in achieving long term system productivity.

BRIEF DESCRIPTION

The present disclosure provides systems and methods for constructing plans that can be executed in a production plant to achieve one or more production goals while concurrently facilitating diagnostic information gain. In accordance with one or more aspects of the disclosure, the plan construction system comprises a diagnosis engine and a planner, with the diagnosis engine determining a current plant condition based at least partially on a previously executed plan, one or more corresponding observation from the plant, and a model of the plant. The diagnosis engine is further operative to formulate a heuristic based on at least one diagnostic objective. The planner is operative to perform a partial-plan search using the heuristic to construct the plans for execution in the plant that will concurrently achieve a production goal and facilitate the diagnostic objective. The planner in one implementation performs an A* partial-plan search using the heuristic to construct the plans. The diagnosis engine may be further operative to calculate plan fault probabilities based on action failure probabilities at least partially according to the current plant condition, to generate information gain criterion for plans based at least partially on the current plant condition, and to formulate the heuristic based at least partially on the plan fault probabilities and the information gain criterion. In certain embodiments, moreover, the diagnosis engine derives failure probabilities for a plurality of fault hypothesis in the plant in formulating the heuristic, and may formulate a lower and upper plan failure probability bounding heuristic based at least partially on the current system condition. In accordance with further aspects of the disclosure, the planner may advantageously perform search space pruning to speed up the partial-plan search, and may evaluate partial plans so as to preferentially construct informative plans based on the diagnostic objective, such as plans with a failure probability closest to 0.5.

In accordance with still other aspects of the disclosure, a plan construction method is provided, including determining a current plant condition, formulating a heuristic based on one or more diagnostic objectives, performing a partial-plan search using the heuristic, and constructing plans that will concurrently achieve at least one production goal and facilitate the diagnostic objective(s) based on the partial-plan search. In certain implementations, the method further includes calculating plan fault probabilities based on action failure probabilities, generating information gain criterion for plans based at least partially on the current plant condition, and formulating the heuristic based on the plan fault probabilities and the information gain criterion. The heuristic formulation, moreover, may include deriving failure probabilities for a plurality of fault hypothesis in the plant based at least partially on the current system condition, and the heuristic may be formulated as a lower and upper plan failure probability bounding heuristic. Some embodiments of the method may also include performing search space pruning to speed up the partial-plan search, and the partial-plan search may include evaluating partial plans according to the heuristic to preferentially construct informative plans based on a diagnostic objective.

Further aspects of the disclosure provide a computer readable medium with computer executable instructions for determining a current plant condition based at least partially on a previously executed plan, at least one corresponding observation from the plant, and a model of the plant, formulating a heuristic based on at least one diagnostic objective, performing a partial-plan search using the heuristic, and constructing plans for execution in the plant that will concurrently achieve at least one production goal and facilitate the at least one diagnostic objective based on the partial-plan search.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
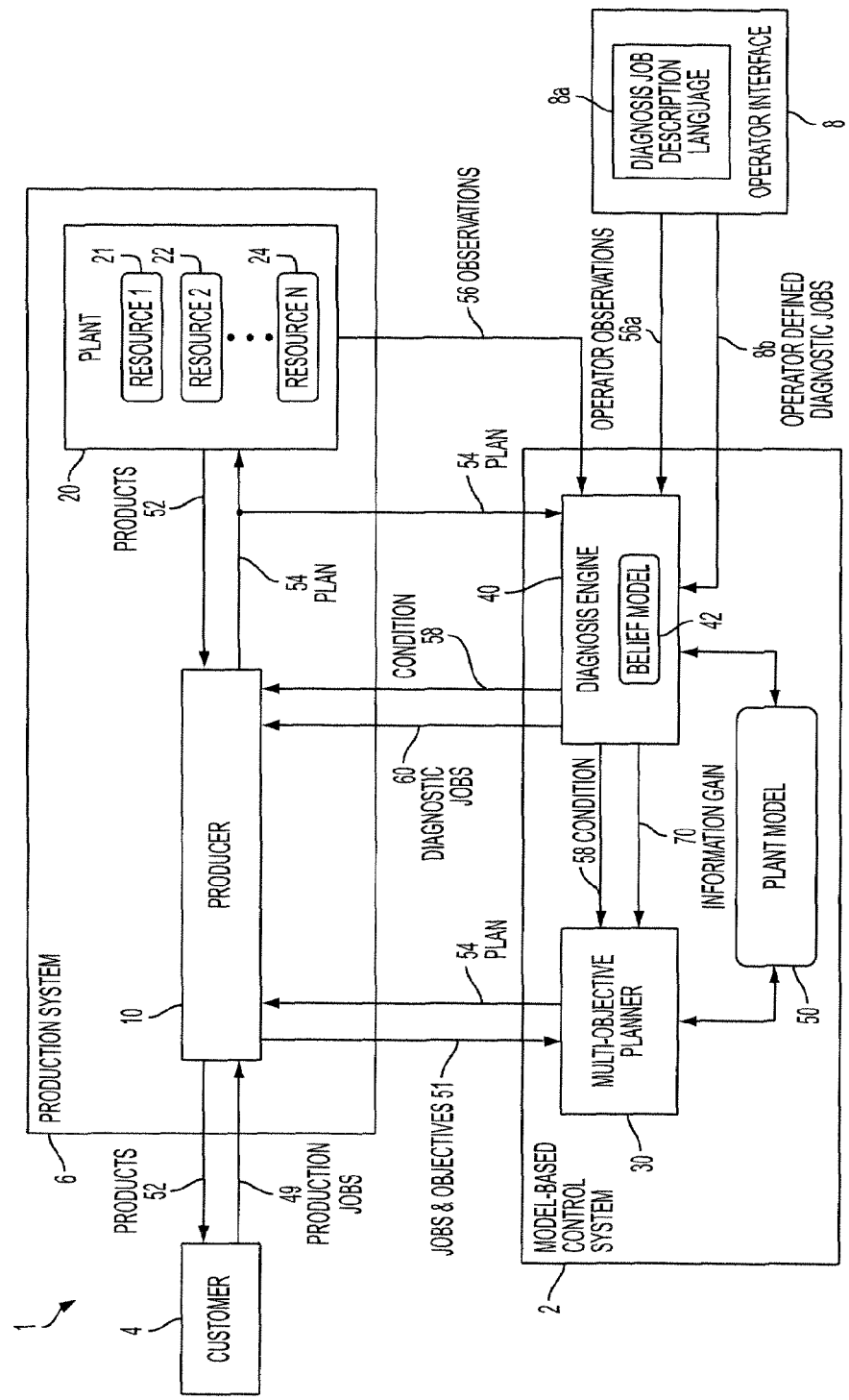
FIG. 1 is a schematic diagram illustrating a production system and an exemplary model-based control system with a planner, a plant model, a diagnosis engine, and a operator interface in accordance with one or more aspects of the disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to construction of production plans for production systems and is hereinafter illustrated and described in the context of exemplary document processing systems having various printing and document transport resources. However, the concepts of the disclosure also find utility in association with generating plans for product packaging systems and any other type or form of system in which a plurality of resources, whether machines, humans, software or logic components, objects, etc., may be selectively employed according to plans comprised of a series of actions to achieve one or more production goals based at least partially on one or more diagnostic metrics or objectives, wherein all such alternative or variant implementations are contemplated as falling within the scope of the present disclosure and the appended claims. The disclosure finds particular utility in constructing and scheduling plans in systems in which a given production goal can be achieved in two or more different ways, including use of different resources (e.g., two or more print engines that can each perform a given desired printing action, two different substrate routing paths that can be employed to transport a given printed substrate from one system location to another, etc.), and/or the operation of a given system resource at different operating parameter values (e.g., operating substrate feeding components at different speeds, operating print engines at different voltages, temperatures, speeds, etc.).

Figure 2:
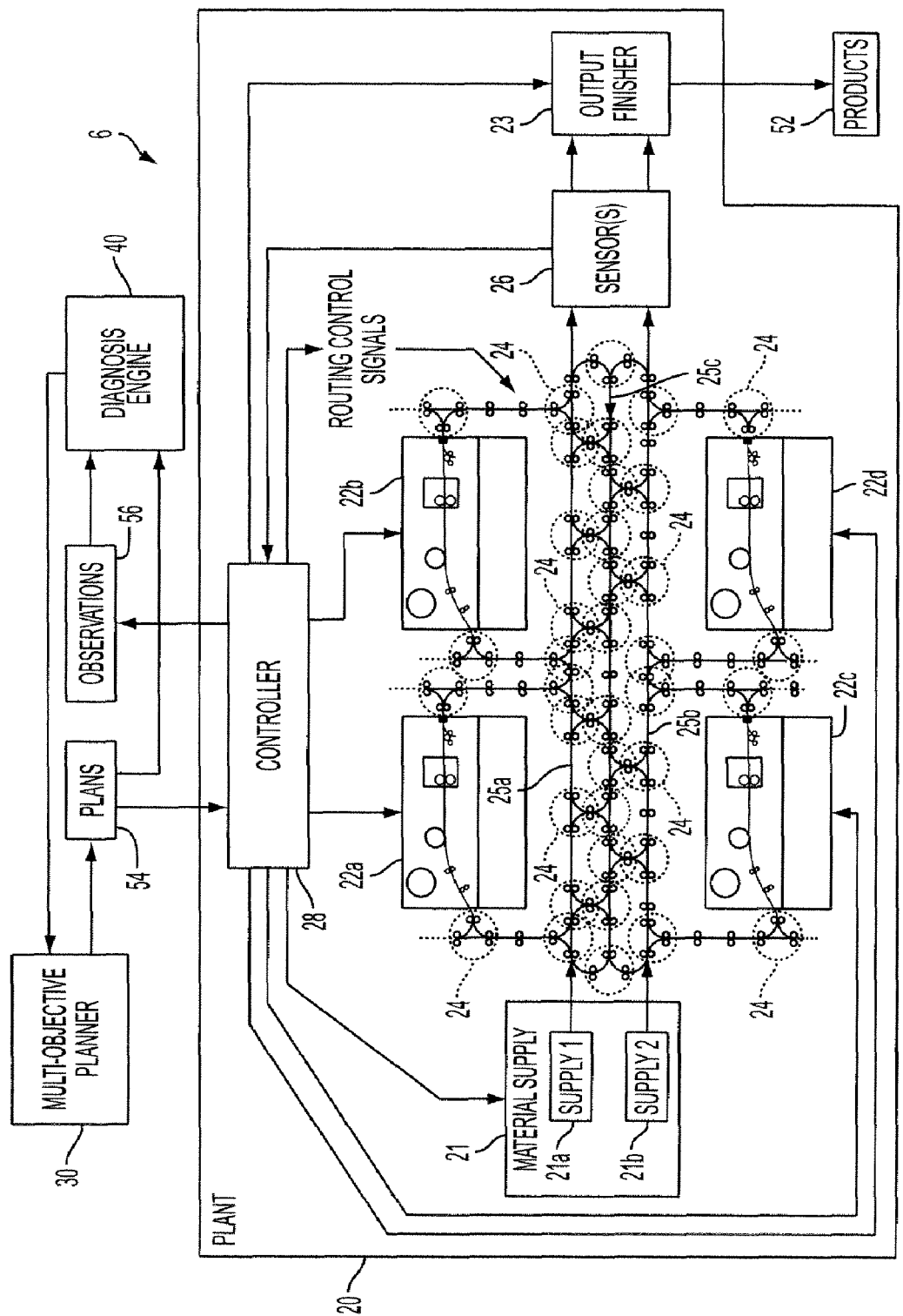
FIG. 2 is a schematic diagram illustrating further details of an exemplary modular printing system plant in the production system of FIG. 1.
Figure 3:
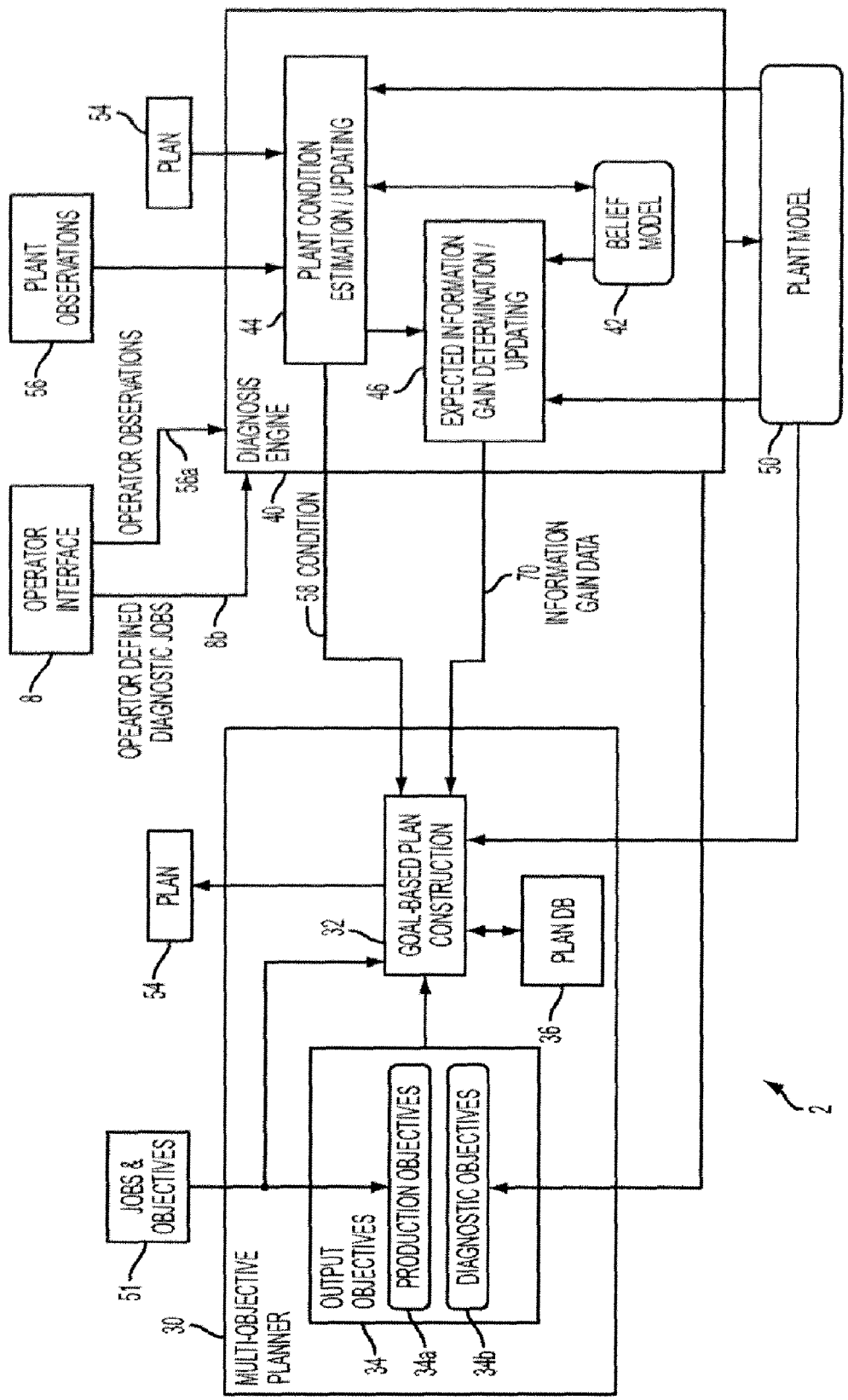
FIG. 3 is a schematic diagram illustrating further details of the exemplary planner and diagnosis engine in the control system of FIGS. 1 and 2.

FIGS. 1-3 illustrate on such system 1 in which the various plan construction aspects of the present disclosure may be implemented. As best shown in FIG. 1, a production system 6 is illustrated including a producer component 10 that receives production jobs 49 from a customer 4 and a plant 20 having a plurality of resources 21-24 that may be actuated or operated according to one or more plans 54 so as to produce one or more products 52 for provision to the customer 4 by the producer 10, where 'producing' products can include modifying products, objects, etc., including without limitation packaging or wrapping products. FIG. 2 illustrates further details of one exemplary plant 20 and FIG. 3 shows additional details regarding the exemplary model-based control system 2. The producer 10 manages one or more plants 20 which actually produce the output products 52 to satisfy customer jobs 49. The producer 10 in this embodiment provides jobs and objectives 51 to a multi-objective planner 30 of the model-based control system 2 and the production system 6 receives plans 54 from the planner 30 for execution in the plant 20. The jobs 54 can include one or both of production and diagnostic goals. As shown in FIG. 1, the control system 2 further includes a plant model 50 with a model of the plant 20, and a diagnosis engine 40 with a belief model 42. The diagnosis engine 40 determines and updates a current plant condition 58 via a plant condition estimation/updating component 44 (FIG. 3) based on one or more previously executed plans 54, corresponding observations 56 from the plant 20, and the model 50. The diagnosis engine 40 also provides expected information gain data 70 to the planner 30 for one or more possible plans 54 based on the current plant condition 58 and the model 50.

The model-based control system 2 and the components thereof may be implemented as hardware, software, firmware, programmable logic, or combinations thereof, and may be implemented in unitary or distributed fashion. In one possible implementation, the planner 30, the diagnosis engine 40, and the model 50 are software components and may be implemented as a set of sub-components or objects including computer executable instructions and computer readable data executing on one or more hardware platforms such as one or more computers including one or more processors, data stores, memory, etc. The components 30, 40, and 50 and sub components thereof may be executed on the same computer or in distributed fashion in two or more processing components that are operatively coupled with one another to provide the functionality and operation described herein. Likewise, the producer 10 may be implemented in any suitable hardware, software, firmware, logic, or combinations thereof, in a single system component or in distributed fashion in multiple interoperable components. In this regard, the control system 2 may be implemented using modular software components (e.g., model 50, planner 30, diagnosis engine 40 and/or sub components thereof) to facilitate ease of debugging and testing, the ability to plug state of the art modules into any role, and distribution of operation over multiple servers, computers, hardware components, etc.

The embodiment of FIG. 1 also includes an optional operator interface 8 implemented in the computer or other platform(s) on which the other components of the control system 2 are implemented, although not a strict requirement of the disclosure, wherein the operator interface 8 may alternatively be a separate system operatively coupled with the control system 2. The exemplary operator interface 8 is operatively coupled with the diagnosis engine 40 to provide operator observations 56a to the diagnosis engine 40, with the diagnosis engine 40 determining the current plant condition 58 based at least partially on the operator observations 56a in certain implementations. Moreover, the exemplary operator interface 8 allows the operator to define a diagnostic job 8b using a diagnosis job description language 8a, and the diagnosis engine 40 may provide diagnostic jobs 60 to the producer 10. The diagnosis engine 40 in this implementation is operative to selectively provide one or more self-generated diagnostic jobs 60 and/or operator defined diagnostic jobs 8b to the producer 10, which in turn provides jobs and objectives 51 to the planner 30.

Referring also to FIGS. 2 and 3, the planner 30 provides one or more plans 54 to the production system 6 for execution in the plant 20 based on at least one output objective 34 (FIG. 3) and production goals as directed by the incoming jobs 51 from the producer 10. As shown in FIG. 3, the planner 30 selectively factors in one or more output objectives 34 derived from the jobs and objectives 51 in constructing plans 54 including production objectives 34a and diagnostic objectives 34b. In one possible implementation, the production objectives 34a are created and updated according to the jobs and objectives 51 obtained from the production system 6, and the diagnostic objectives 34b are derived from and updated according to the current plant condition 58 and the expected information gain data 70 provided by the diagnosis engine 40. The production objectives 34a in one implementation may relate to the scheduling of orders for produced products 52 (FIG. 1), and may include prioritization of production, minimization of inventory, and other considerations and constraints driven in large part by cost and customer needs. Examples of production objectives 34a include prioritizing plan construction/generation with respect to achieving a given product output goal (simple production criteria) as well as a secondary consideration such as simple time efficient production, cost efficient production, and robust production. For instance, cost efficient production objectives 34a will lead to construction/generation of plans 54 that are the most cost efficient among the plans that met the production goal as dictated by the jobs 51 received from the producer 10. The diagnostic objectives 34b may include objectives related to determining preferred action sequences in generated plans 54 for performing a given production-related task, minimization of maintenance and repair costs in operation of the plant 20, identifying resources 21-24 causing intermittent or persistent faults, etc.

As further shown in FIG. 3, the control system 2 may optionally include a plan data store or database 36 used to store plans 54 selectable by the planner 30 for execution in the plant 20 to facilitate one or more production or diagnostic objectives 34, wherein construction/generation of a plan 54 as used herein can include selection of one or more pre-stored plans 54 from the data store 36. In this regard, the planner 30 can selectively re-order a job queue so as to improve the likelihood of information gain. Although illustrated as integral to the planner 30, the plan data store 36 may be provided in a separate component or components that are operatively coupled with the planner 30 by which the planner 30 can obtain one or more plans 54 (whole and/or partial) therefrom. Alternatively or in combination, the planner 30 can synthesize (e.g. construct or generate) one or more plans 54 as needed, using the plant model 50 and information from the producer 10 and diagnosis engine 40 to determine the states and actions required to facilitate a given production and/or diagnostic objectives 34.

The planner 30 creates and provides plans 54 for execution in the plant 20. The plans 54 include a series of actions to facilitate one or more production and/or diagnostic objectives 34 while achieving a production goal according to the jobs 51, and in which a given action may appear more than once. The actions are taken with respect to states and resources 21-24 defined in the model 50 of the plant 20, for example, to route a given substrate through a modular printing system 20 from a starting state to a finished state as shown in FIG. 2. In operation, the planner 30 generates or constructs a plan 54 that will achieve a given production goal at least partially based on a diagnostic objective 34b and the expected information gain data 70 from the diagnosis engine 40. The planner 30 in the illustrated embodiment includes a goal-based plan construction component 32 that assesses the current plant condition 58 from the diagnosis engine 40 in generating a plan 54 for execution in the plant 20. The component 32 may also facilitate identification of faulty components 21-24 or sets thereof in constructing the plans 54 based on observations 56 and current plant conditions 58 indicating one or more plant components 21-24 as being suspected of causing system faults.

Figure 4:
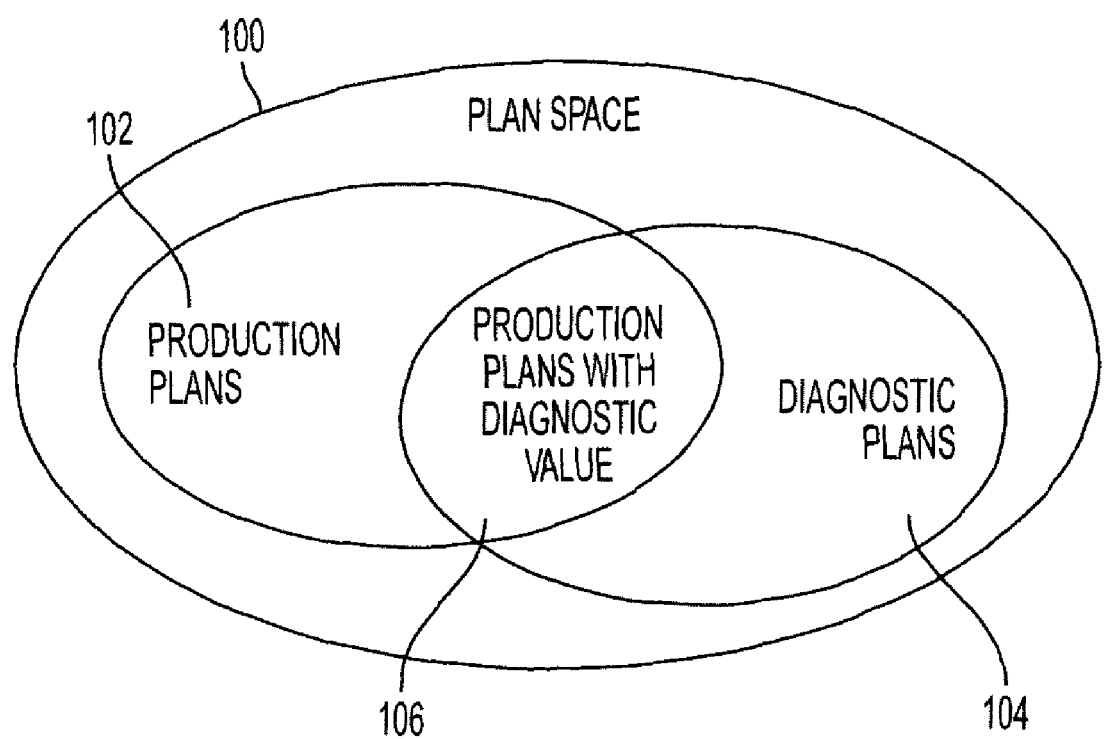
FIG. 4 is a schematic diagram illustrating a plan space for a production system, including production and diagnostic plans.

Referring also to FIG. 4, the presently disclosed intelligent plan construction techniques advantageously provide for generation of plans 54 for execution in the plant 20 within a plan space 100 that includes both production plans 102 and diagnostic plans 104. As seen in the diagram of FIG. 4, the union of the plan sets 102 and 104 includes production plans 106 that have diagnostic value (e.g., can facilitate one or more diagnostic objectives 34b in FIG. 3), wherein the planner 30 advantageously utilizes information from the diagnosis engine 40 to preferentially construct plans 106 that achieve production goals while obtaining useful diagnostic information in accordance with the diagnostic objectives 34b. The intelligent plan construction aspects of the present disclosure thus integrate the production planning and diagnosis to facilitate the acquisition of more useful diagnostic information compared with conventional passive diagnostic techniques without the down-time costs associated with conventional dedicated diagnostics. The diagnostic information gained, in turn, can be used to improve the long term productivity of the system 6, thereby also facilitating one or more production objectives 34a (FIG. 3).

As further illustrated in FIG. 3, the diagnosis engine 40 in one embodiment includes a belief model 42 representing the current state of the plant 20, and a component 44 that provides the current condition of the plant 20 to the planner 30 based on the previous plan(s) 54 and corresponding plant observations 56. The component 44 also estimates and updates the plant condition of the belief model 42 according to the plant observations 56, the plant model 50, and the previously executed plans 54. The operator observations 56a from the interface 8 may also be used to supplement the estimation and updating of the current plant condition by the component 44. The estimation/updating component 44 provides the condition information 58 to inform the planner 30 of the confirmed or suspected condition of one or more resources 21-24 or other components of the plant 20 (FIG. 1). This condition information 58 may be considered by the plan construction component 32, together with information about the plant 20 from the plant model 50 in providing plans 54 for implementing a given production job or goal 51, in consideration of production objectives 34a and diagnostic objectives 34b. The diagnosis engine 40 also includes a component 46 that provides expected information gain data 70 to the planner 30 based on the model 50 and the belief model 42. The information gain data 70 may optionally be determined in consideration of the operator defined diagnostic jobs 8b from the operator interface 8.

FIG. 2 illustrates further details of an exemplary modular printing system plant 20 in the production system 6, including material supply component 21 that provides printable sheet substrates from one of two supply sources 21a and 21b, a plurality of print or marking engines 22, an output finisher station 23, a modular substrate transport system including a plurality of bidirectional substrate transport/router components 24 (depicted in dashed circles in FIG. 2), one or more output sensors 26 disposed between the transport system 24 and the finisher 23, and a controller 28 providing control signals for operating the various actuator resources 21-24 of the plant 20. The exemplary printing system plant 20 includes four print engines 22a, 22b, 22c, and 22d, although any number of such marking engines may be included, and further provides a multi-path transport highway with three bidirectional substrate transport paths 25a, 25b, and 25c, with the transport components 24 being operable by suitable routing signals from the controller 28 to transport individual substrate sheets from the supply 21 through one or more of the marking engines 22 (with or without inversion for duplex two-side printing), and ultimately to the output finishing station 23 where given print jobs are provided as output products 52.

Each of the printing engines 22, moreover, may individually provide for local duplex routing and media inversion, and may be single color or multi-color printing engines operable via signals from the controller 28. The model-based control system 2 may, in certain embodiments, be integrated into the plant controller 28, although not a strict requirement of the present disclosure.

Referring now to FIGS. 1-3, in operation, the planner 30 automatically generates plans 54, for example, by piece-wise determination of a series of actions to form a plan and/or by obtaining whole or partial plans 54 from the data store 36 for component resources 21-24 of the printing system plant 20 from a description of output production goals derived from the incoming jobs 51 in consideration of one or more production objectives 34a and diagnostic objectives 34b. In particular, when the plant 20 has flexibility in how the output goals can be achieved (e.g. in how the desired products 52 can be created, modified, packaged, wrapped, etc.), such as when two or more possible plans 54 can be used to produce the desired products 52, the diagnosis engine 40 can alter or influence the plan construction operation of the planner 30 to generate a plan 54 that is expected to yield the most informative observations 56. The constructed plan 54 in this respect may or may not result in a plan that compromises short term production objectives 34a (e.g., increases job time or slightly lowers quality), but production nevertheless need not be halted in order for the system to learn. The additional information gained from execution of the constructed job 54 can be used by the producer 10 and/or by the planner 30 and diagnosis engine 40 to work around faulty component resources 21-24, to schedule effective repair/maintenance, and/or to further diagnose the system state (e.g., to confirm or rule out certain system resources 21-24 as the source of faults previously detected by the sensor(s) 26). In this manner, the information gleaned from the constructed plans 54 (e.g., plant observations 56) can be used by the estimation and updating component 44 to further refine the accuracy of the current belief model 42.

Moreover, where the plant 20 includes only limited sensing capabilities, (e.g., such as the system in FIG. 2 having only sensors 26 at the output of the transport system 24 downstream of the printing engines 22), passive diagnosis are unable to unambiguously identify every possible fault in the system 20, whereas direct diagnostic efforts lead to system down-time and the associated cost in terms of productivity. The control system 2 of the present disclosure, on the other hand, advantageously facilitates selective employment of intelligent on-line diagnosis though construction and execution of plans 54 that provide enhanced diagnostic information according to the plant condition 58 and/or the expected information gain 70, and may further advantageously facilitate generation of one or more dedicated diagnostic plans 54 for execution in the plant 20 based on at least one diagnostic objective 34b and the plant condition 58, and for intelligent interleaving of dedicated diagnostic plans 54 and production plans 54 based on production and diagnostic objectives 34 according to the current plant condition 58. In particular, the planner 30 can cause execution of explicit diagnostic plans 54 that involve halting production when the information gained from the plan 70 is expected to lead to significant future gains in productivity, enhanced ability to identify faulty resources 21-24, or other long term productivity objectives 34a and/or diagnostic objectives 34b.

Even without utilizing dedicated diagnostic plans 54, moreover, the control system 6 significantly expands the range of diagnosis that can be done online through pervasive diagnostic aspects of this disclosure during production (e.g., above and beyond the purely passive diagnostic capabilities of the system), thereby lowering the overall cost of diagnostic information by mitigating down time, the number of service visits, and the cost of unnecessarily replacing components 21-24 in the system 20 that are actually working, without requiring complete sensor coverage. The planner 30 is further operative to use the current plant condition 58 in making a tradeoff between production objectives 34a and diagnostic objectives 34b in generating plans 54 for execution in the plant 20, and may also take the condition 58 into account in performing diagnosis in isolating faulty resources 21-24 in the plant 20.

The plant condition estimation and updating component 44 of the diagnosis engine 40 infers the condition of internal components 21-24 of the plant 20 at least partially from information in the form or observations 56 derived from the limited sensors 26, wherein the diagnosis engine 40 constructs the plant condition 58 in one embodiment to indicate both the condition (e.g., normal, worn, broken) and the current operational state (e.g., on, off, occupied, empty, etc.) of the individual resources 21-24 or components of the plant 20, and the belief model 42 can be updated accordingly to indicate confidence in the conditions and/or states of the resources or components 21-24. In operation of the illustrated embodiment, once the producer 10 has initiated production of one or more plans 54, the diagnosis engine 40 receives a copy of the executed plan(s) 54 and corresponding observations 56 (along with any operator-entered observations 56a). The condition estimation and updating component 44 uses the observations 56, 56a together with the plant model 50 to infer or estimate the condition 58 of internal components/resources 21-24 and updates the belief model 42 accordingly. The inferred plant condition information 58 is used by the planner 30 to directly improve the productivity of the system 20, such as by selectively constructing plans 54 that avoid using one or more resources/components 21-24 known (or believed with high probability) to be faulty, and/or the producer 10 may utilize the condition information 58 in scheduling jobs 51 to accomplish such avoidance of faulty resources 21-24. The exemplary diagnosis engine 40 also provides future prognostic information to update the diagnostic objectives 34b which may be used by the planner 30 to spread utilization load over multiple redundant components 21-24 to create even wear or to facilitate other long term objectives 34.

To improve future productivity, moreover, the diagnosis engine 40 provides the data 70 to the planner 30 regarding the expected information gain of various possible production plans 54. The planner 30, in turn, can use this data 70 to construct production plans 54 that are maximally diagnostic (e.g., most likely to yield information of highest diagnostic value). In this manner, the planner 30 can implement active diagnostics or active monitoring by using carefully generated or modified production plans 54 to increase information during production (e.g., using 'diagnostic' production plans). Moreover, certain diagnostic plans 54 are non-productive with respect to the plant 20, but nevertheless may yield important diagnostic information (e.g., operating the transport mechanisms 24 in FIG. 2 such that all the substrate transport paths 25a, 25b, and 25c go in the backward direction away from the output finisher 23). Within this space of plans 54 that do not accomplish any production goals, the operator interface 8 allows an operator to create diagnostic jobs 8b via the job description language 8a, and the diagnosis engine 40 may also include a diagnosis job description language to generate dedicated/explicit diagnostic jobs 60 which are provided to the producer 10. The producer 10 may then provide these jobs 60 to the planner 30 along with the other jobs and objectives 51 to explicitly request the planner 30 to advance diagnostic objectives 34b. The producer 10 in one implementation may operate a job queue that queues requested customer and diagnostic jobs 49, 60 and the producer 10 receives component condition updates 58 from the diagnosis engine 40. The producer 10 uses the condition 58 to choose between customer jobs 49 and diagnosis jobs 60, to tradeoff production efficiency versus diagnostic value in production plans 54, and to merge (e.g., interleave) customer jobs 49 and dedicated diagnostic jobs 60 when they are compatible and wherein the scheduling thereof can facilitate one or more diagnostic and production objectives 34. The diagnosis engine 40 can also provide prognostic information to the planner 30 to help improve the quality of the plans 54 with respect to certain criteria. For example, the planner 30 (e.g., and/or the producer 10) is operative to selectively use fault state information to construct from multiple suitable production plans 54 based on the prognosis of plan alternatives for "robust printing" to distribute workload evenly across different resources 21-24 in order to reduce the frequency of scheduled or unscheduled maintenance of the plant 20.

Figure 5:
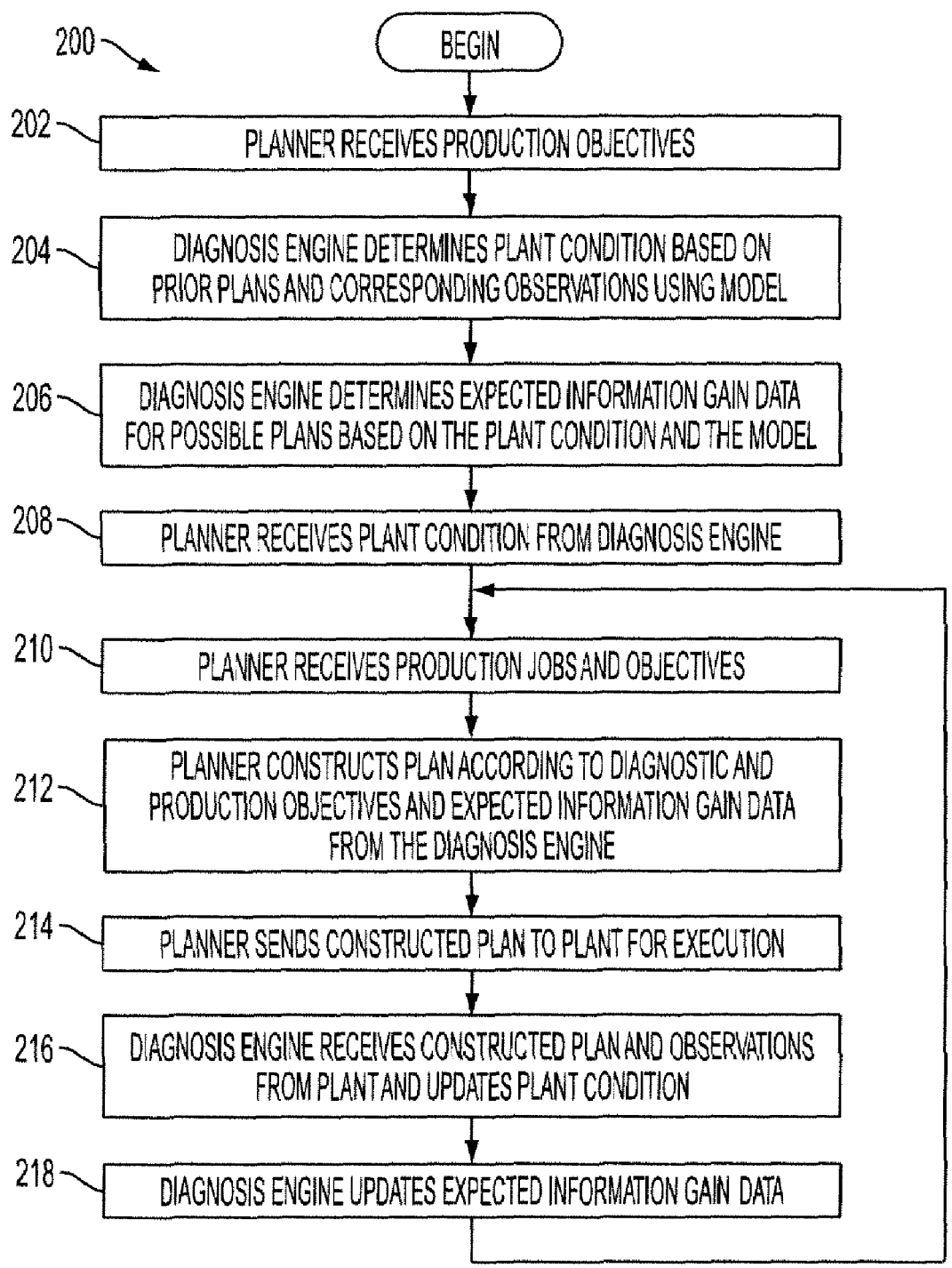
FIG. 5 is a flow diagram illustrating an exemplary method for constructing plans for execution in a production system in accordance with one or more aspects of the present disclosure.

Referring also to FIG. 5, an exemplary method 200 is illustrated for constructing plans 54 for execution in a production system 6 with a plant 20 having a plurality of resources 21-24 to achieve one or more production goals. While the method 200 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 200 other methods of the disclosure may be implemented in hardware, software, or combinations thereof, such as in the exemplary control system 2 described above, and may be embodied in the form of computer executable instructions stored in a computer readable medium, such as in a memory operatively associated with the control system 2 in one example.

Diagnostic objectives 34b are received at 202 in the method 200. The method 200 further includes determining a current plant condition 58 at 204 based at least partially on a previously executed plan 54 and at least one corresponding observation 56 from the plant 20 using a plant model 50, and determining expected information gain data 70 at 206 based on the current plant condition 58 and the model 50. The planner 30 receives the plant conditions 58 at 208 from the diagnosis engine 40, and receives production jobs and objectives 51 at 210 from the producer 10. At 212, the planner 30 constructs a plan 54 at based at least partially on a diagnostic objective 34b and the expected information gain data 70. At 214, the planner 30 sends the constructed plan 54 to the plant 20 for execution and the diagnosis engine 40 receives the plan 54 and the plant observations 56 at 216. At 218, the diagnosis engine 40 updates the plant condition 58 and updates the expected information gain data 70, after which further jobs and objectives 51 are serviced and the process 200 continues again at 210 as described above.

The plan construction at 212 may be based at least partially on the current plant condition 58, and may include making a tradeoff between production objectives 34a and diagnostic objectives 34b based at least partially on the current plant condition 58. Moreover, the plan construction at 212 may include performing prognosis to isolate faulty resources 21-24 in the plant 20 based at least partially on the current plant condition 58. In certain embodiments, a dedicated diagnostic plan 54 may be constructed for execution in the plant 20 based at least partially on at least one diagnostic objective 34b, a diagnostic job 60, 8b, and the current plant condition 58, and the plan construction may provide for selectively interleaving dedicated diagnostic and production plans 54 based on at least one production objective 34a and at least one diagnostic objective 34b. Further embodiments of the method 200 may also include allowing an operator to define a diagnostic plan 8b using a diagnosis job description language 8a and receiving operator observations 56a, with the plan selection/generation at 216 being based at least partially on the operator observations 56a.

In accordance with further aspects of the present disclosure, a computer readable medium is provided, which has computer executable instructions for performing the steps of determining a current plant condition 58 in a production system 6 with a plant 20 having a plurality of resources 21-24 based at least partially on a previously executed plan 54, at least one corresponding observation 56 from the plant 20, and a plant model 50, and computer executable instructions for determining expected information gain data 70 based on the current plant condition 58 and the model 50. The medium further includes instructions for constructing a plan 54 for execution in the plant 20 to achieve one or more production goals based at least partially on a diagnostic objective 34b and the expected information gain data 70. In various embodiments, further computer executable instructions are included in the medium for constructing the plan 54 based at least partially on the current plant condition 58.

Figure 6:
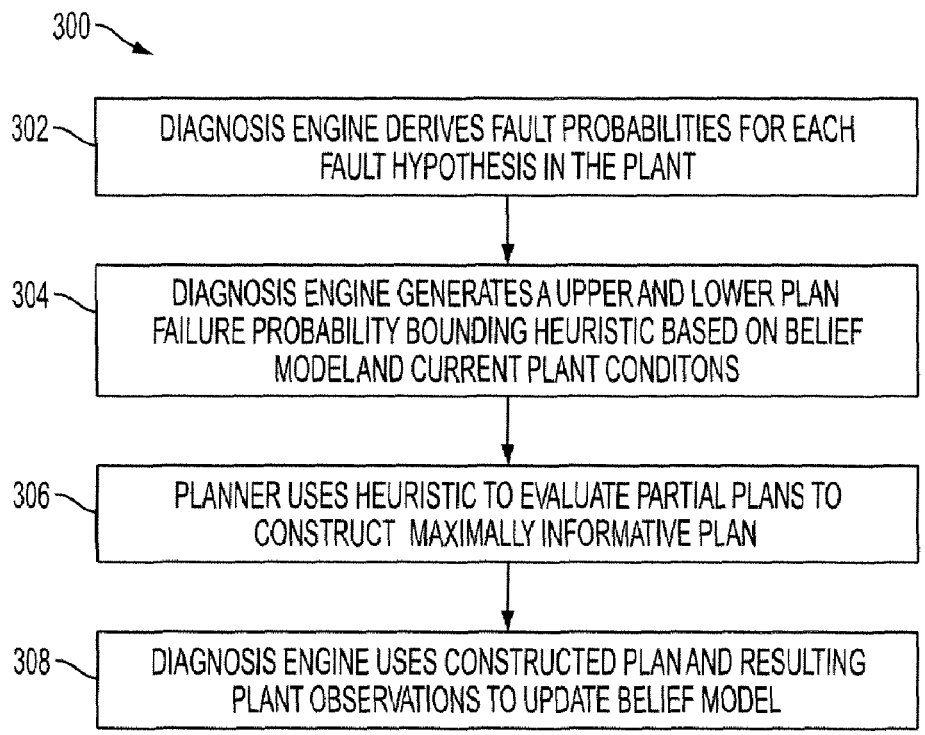
FIG. 6 is a flow diagram illustrating an exemplary method of evaluating and generating plans for execution in the plant using an A* search.
Figure 7:
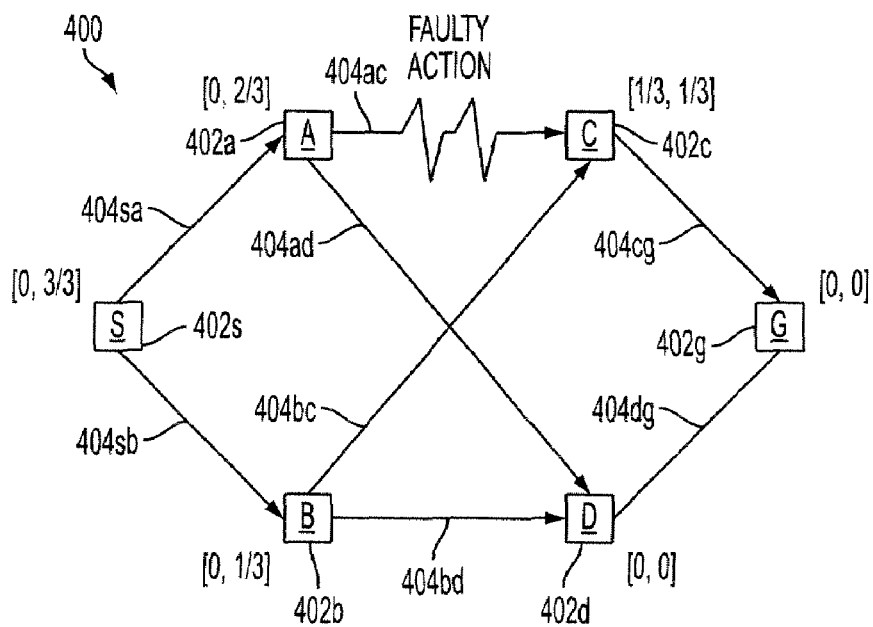
FIG. 7 is a schematic diagram illustrating an exemplary state/action diagram showing possible plans for transitioning the system state from a starting state to a goal state.

Referring now to FIGS. 6 and 7, a variety of techniques can be employed by the planner 30 in the above described control system 6 in constructing plans 54 to enhance diagnostic information gain while achieving production goals. In one embodiment, a heuristic search is employed by the planner 30 in constructing diagnostic production plans 54. FIG. 6 illustrates an exemplary method 300 for evaluating and constructing plans for execution in the plant 20 using A* search. In this embodiment, the component 44 of the diagnosis engine 40 (FIG. 3) establishes and updates beliefs in the belief model 42 about the plant conditions and updates the plant model 50. At 302 in FIG. 6, the component 44 derives failure or fault probabilities for each fault hypothesis in the plant 20 and employs dynamic programming at 304 to generate a upper and lower plan failure probability bounding heuristic based on the belief model 42 and the current plant condition 58. At 306, the planner 30 uses the heuristic to evaluate partial plans 54 so as to construct maximally informative plans 54, preferably using an A* search approach. At 308, the diagnosis engine 40 then uses the constructed plan 54 and output observations 56 obtained from execution of the constructed plan 54 in the plant 20 to update the belief model 42.

The diagnosis engine 40 in this approach advantageously provides the inputs for searching by the planner 30 in order to derive valuable information for the diagnosis of the system 20. In this embodiment, the best plans 54 with respect to diagnostic value for single persistent faults are those that have an equal probability of succeeding or failing. The diagnosis engine 40 uses this notion to develop heuristics to guide the search by the planner 30 in evaluating partial plans 54 to construct the plan 54 to be executed in the plant 20. In addition, the plan construction search may employ pruning techniques to improve search performance. By this approach, the control system 2 implements efficient on-line active or pervasive diagnosis in controlling the plant 20 through a combination of model-based probabilistic inference in the diagnosis engine 40 with decomposition of the information gain associated with executing a given plan 54 using an efficient heuristic target search in the planner 30. In this active diagnosis technique, specific inputs or control actions in the form of plans 54 are constructed by the planner 30 with the help of the diagnosis engine 40 to maximize or increase the amount and/or quality of diagnostic information obtained from the controlled system plant 20. The informative production (active or pervasive diagnosis) techniques of the present disclosure rank the set of partial plans at any given point in the construction process that achieve production goals by their potential information gain and the planner 30 operates to selectively generate the most promising strategy in that respect, in consideration of other possible production objectives 34*a* and diagnosis objectives 34*b*.

As discussed above in the context of the exemplary modular printing system plant 20 of FIG. 2, the planner 30 operates to construct the sequence of actions (plan 54) that transfers substrate sheets through the system 20 to generate a requested output for a given print job (e.g. to satisfy a production goal), using pervasive diagnosis to aid in plan construction. One particular production objective 34*a* in this system 20 is to continue printing even if some of the print engines 22 fail or some of the paper handling modules 24 fail or jam. In this exemplary modular printing system example 20, moreover, there are only output type sensors 26 preceding the finisher 23, and as a result, a plan 54 consisting of numerous actions must be executed before a useful observation 56 can be made. The diagnosis engine 40 updates its belief model 42 and the current condition 58 to be consistent with the executed plan 54 and the observations 56. The diagnosis engine 40 forwards updated condition information 58 and the expected information gain data 70 to the planner 30.

In the exemplary planner 30, a search algorithm may be employed to find and construct plans 54. The model 50 describes the plant system 20 as a state machine with all possible actions A that the plant 20 can accommodate. Actions are defined by preconditions and post-conditions over the system state. As such, an action requires the system 20 to be in a certain state in order to be executable and modifies the system state when executed. The system 20 is controlled by plan p (54) that is comprised of a sequence of actions $a_1, a_2, \ldots, a_n$ drawn from the set A of possible actions. Execution of an action potentially changes the system state, and part of the system state may represent the state of a product 52 at any given time, particularly if the action is part of a production plan 54. Further, internal constraints of the system 54 limit the set of plans 54 to a subset of all possible sequences (e.g., the plan space 100 in FIG. 4 above). Moreover, the execution of actions of a given plan p in the system 20 may result in only a single observable plan outcome or observation O (e.g., observation 56 from sensor 26).

One type of observable outcome 26 is defined as abnormal, denoted ab(p), in which the plan 54 fails to achieve its production goal. Another type is a normal (not abnormal) outcome, denoted ¬ab(p) in which the plan 54 achieves the associated production goal. In the exemplary control system 2, information about the plant 20 may be represented by the diagnosis engine's belief in various possible hypotheses, constituted in the belief model 42, where such a hypothesis h is an assignment of abnormal or normal to each of the system actions e.g., $h=[ab(a_1), \neg ab(a_2), \ldots, ab(a_n)]$. In the example case of a fault in a single plant resource/component (single fault case), exactly one action will be abnormal. Defining $H_{SYS}$ as a set of all hypotheses excluding a single hypothesis (a "no fault" hypothesis $h_0$) for the situation where all actions are normal, every hypothesis is a complete assignment of abnormality to each action, and all are unique and mutually exclusive (e.g., $\forall h_i, h_j \in H_{sys}, h_i \neq h_j$). The system's beliefs in the belief model 42 can be represented as a probability distribution over the hypothesis space $H_{sys}$, Pr(H), where the belief model 42 is updated by the diagnosis engine 40 from past observations 56 using Bayes' rule to get a posterior distribution over the unknown hypothesis H given observation O and plan P: $Pr(H|O, P) = \alpha Pr(O|H, P) Pr(H)$.

A plan p is deemed by the diagnosis engine 40 and the planner 30 as being informative if it contributes information to (e.g., reduces the uncertainty of) the diagnosis engine's beliefs 42, where the informative value can be measured as the mutual information between the system beliefs Pr(H) and the plan outcome conditioned on the plan executed, I(H; O|P=p). This mutual information may be defined in terms of entropy or uncertainty implied by a probability distribution, where a uniform probability distribution has high uncertainty and a deterministic distribution has low uncertainty. In the context of diagnostic information value, an informative plan 54 reduces the uncertainty of the system's beliefs 42, and thus plans 54 with outcomes that are hard to predict are the most informative, while execution of plans 54 that are known to succeed (or known to fail) will yield no diagnostic information gain. In this respect, an optimal (e.g., 'target') uncertainty T may be used to rate the plans 54 with respect to expected informative value, by which the diagnosis engine 40 can evaluate plans 54 accordingly and provide the expected information gain data 70 to the planner 30 to influence the plan selection/generation for preferential selection/generation of informative plans 54.

In the case of persistent single faults, a value of T=0.5 can be use as the optimal uncertainty about the outcome, and uncertainty in the case of intermittent faults may be maximized in the range of about $0.36 \leq T \leq 0.5$ in one exemplary implementation. In finding a plan 54 with a given amount of uncertainty T, the diagnosis engine 40 is operative to predict the uncertainty associated with a given plan $p=[a_1, a_2, \ldots, a_n]$, where the set of unique actions in a plan $A_p = U_i \{a_i \in p\}$. Presuming f failures are observable, a plan 54 will be abnormal ab(p) if one or more of its actions are abnormal, as set forth in the following equation (1):

$$ab(a_1) \vee \ldots \vee ab(a_n) \Rightarrow ab(p) \text{ for } a_i \in A_p \qquad (1)$$

where $a_i \in A_p$, and p is the plan. The predicted probability of an action of a plan 54 being abnormal will be a function of the probability assigned to all relevant hypotheses, where the set of hypotheses that influence the uncertainty of the outcome of plan p is denoted $H_p$ and is defined in the following equation (2):

$$H_p = \{h | h \in H_{sys} \text{ and } h \Rightarrow ab(a), a \in A_p\}. \qquad (2)$$

Given a distribution over hypotheses and the set Hp of explanatory hypotheses for a given plan p, it is possible to calculate the probability that plan p will fail. Since every hypothesis $h \in H_p$ contains at least one abnormal action that is also in plan p, hypothesis h being true implies ab(p):

$$(h_1 \vee h_2 \vee \ldots \vee h_m) \Leftrightarrow ab(p) \text{ where } h_j \in H_p \qquad (3)$$

Since the hypotheses are mutually exclusive by definition, the probability of a plan failure Pr(ab(p)) can be defined as the sum of all probabilities of hypotheses which imply that the plan will fail, as in the following equation (4):

$$Pr(ab(p)) = \sum_{k \in H_p} Pr(h) \qquad (4)$$

To find a plan which achieves production goals while also being informative, the planner 30 evaluates the plans 54 in terms of the probability T and uses this and the current plant state 58 to preferentially construct a plan 54 that achieves a production goal while having a positive probability of failure. While in the short term this may likely lower the productivity of the system 20, the information gained allows improvement in long term productivity. The planner 30, moreover, may construct a sequence of plans 54 for execution in the plant 20 which might not be maximally informative individually, but are maximally informative taken jointly.

As noted above, any form of search may be employed in the planner 30 that piece-wise selects/generates from suitable plans that will achieve a given production goal while yielding useful diagnostic information within the scope of the present disclosure. A simple brute force search could be employed to generate all possible action sequences and the resulting list could be filtered to yield plans 54 that achieve production goals while being informative, as per the following equation (5):

$$p^{opt} = \mathrm{argmin}_{achievesGoal(p) \in P} |Pr(ab(p)) - T|. \qquad (5)$$

However, this may be impractical in real-time control applications if the space of plans P is very large. Another possible approach employed in the exemplary system 2 is for the diagnosis engine 40 to establish a heuristic by which the planner 30 considers sets or families of plans 54 that share structure, such as by employing an A* target search using a set of partial plans $p_{I \rightarrow S_1}, p_{I \rightarrow S_2}, \ldots, p_{I \rightarrow S_n}$ which progress from an initial state I to intermediate states $S_1, S_2, \ldots, S_n$. In this approach, for each step, the planner 30 uses the A* target search to attempt to expand the plan most likely to achieve the production goal in the best (e.g., most informative) way. An ideal plan p in this regard would start with the prefix $p_{I \rightarrow S_n}$ which takes the system 20 to a state $S_n$ and continues with the suffix plan $p_{S_n \rightarrow G}$ leading from the state $S_n$ to the goal state G. This A* technique chooses the partial plan $p_{I \rightarrow S_n}$ to expand using a heuristic function $f(S_n)$ provided by the diagnosis engine 40 which estimates the total path quality as the quality of the plan prefix $p_{I \rightarrow S_n}$ (written as $g(S_n)$), plus the predicted quality of the suffix $p_{S_n \rightarrow G}$, (written as $h(S_n)$), per the following equation (6):

$$f(S_n) = g(S_n) + h(S_n). \qquad (6)$$

If the heuristic function $f(S_n)$ never overestimates the true quality of the complete the plan, then the heuristic $f(S_n)$ is said to be admissible and an A* target search by the planner 30 should return an optimal plan 54. In this regard, the underestimation causes the A* search approach to be optimistic in the face of uncertainty, thereby ensuring that uncertain plans are explored before committing to completed plans known to be high in quality. As a result, the more accurate the heuristic function is, the more the A* target search focuses on the highly informative plans 54. In the illustrated embodiments, therefore, the planner 30 employs a heuristic function derived by the diagnosis engine 40 based at least partially on the description of the system architecture and dynamics in the plant model 50.

FIG. 7 shows an exemplary state/action diagram 400 depicting possible plans for transitioning the system state from a starting state S to a goal state G in the plant 20. In this example, the system state nodes 402 include the starting state S 402s, the goal stage G 402g, and four intermediate states 402a-402d for nodes A-D, respectively. A given plan 54 for this example proceeds by following actions 404 through the diagram 400 to ultimately reach the goal G 402g. One possible plan 54 that satisfies such a production goal moves the system through the state sequence [S, A, C, G] through actions 404sa, 404ac, and 404cg as shown in FIG. 7. Assuming for illustrative purposes that this plan 54 results in an abnormal outcome caused by a faulty action 404ac between nodes A and C (action $a_{A,C}$), caused by a single persistent fault in one of the system resources 21-24, the diagnosis engine 40 would determine from the plan 54 and the resulting fault observation 56 that all of the actions 404sa, 404ac, and 404cg along the plan path are (without further information) suspected of being faulty. Since a single persistent fault is assumed, there are three positive probability hypotheses corresponding to the suspected actions $\{\{a_{S,A}\}, \{a_{A,C}\}, \{a_{C,G}\}\}$. Absent additional information, the diagnosis engine 40 initially assigns equal probabilities $\{1/3\}, \{1/3\}, \{1/3\}$ to these suspected actions.

The diagnosis engine 40 uses the graph structure and probability estimates to construct heuristic bounds on the uncertainty that can be contributed to a plan by any plan suffix, in this example, by building up the heuristic from right to left in FIG. 7. In particular, the exemplary diagnosis engine 40 assigns lower and upper bounds [L,U] to the nodes 402, as shown in FIG. 7, and these bound values are sent to the planner 30 in one implementation. As an illustrative example, the action $a_{D,G}$ leading from state D to the goal state G in FIG. 3 was not part of the observed plan 54 that failed, and is therefore not a candidate hypothesis, and this action has a zero probability of being the source of the assumed single persistent system fault. Consequently, extending any prefix plan 54 ending in state D with action $a_{D,G}$ will not increase the failure probability of the extended plan 54, because the action $a_{D,G}$ has probability zero of being abnormal. In this example, moreover, there are no other possible plans 54 from D to G, so both the upper and lower bound for any plan ending in state D is zero, and the node D is thus labeled [0,0] in FIG. 7. State B 402b likewise has a lower bound of zero as plans 54 passing through state B can be completed by an action $a_{B,D}$ 404bd that does not use a suspected action 404 and ends in state D which has a zero lower bound. State B in this example has an upper bound of 1/3 since it can be completed by an unsuspected action $a_{B,C}$ 404bc to state C 402c which in turn has both upper and lower bounds with 1/3 probability of being abnormal. The diagnosis engine 40 continues this analysis recursively to determine bounds on the probability of a suffix sub-plan being abnormal, and sends these as part of the information gain data 70 to the planner 30.

The planner 30 uses these bounds with a forward A* target search to identify and construct a plan 54 that achieves or most closely approximates the target probability T. For example, one possible plan 54 begins from the start node S 402s and includes a first action $a_{S,A}$, which was part of the plan 54 that was observed to be abnormal. If the action $a_{S,A}$ 404ac is added to a partial plan, it must add 1/3 probability to the chance of failure as it is a candidate itself. After $a_{S,A}$, the system 20 would be in state A, and a plan 54 could be completed through D by including actions 404ad and 404dg to arrive at the goal state G 402g. The action $a_{A,D}$ itself has a zero probability of being abnormal since it was not involved in the previously observed faulty plan. Using the heuristic bound, therefore, a completion through state node D 402d adds zero probability of being abnormal. From node A 402a, a plan 54 could alternatively be completed through node C, as in the originally observed plan 54. The corresponding action $a_{A,C}$ 404ac adds 1/3 probability of failure to such a plan and based on the heuristic bound the completion through C 402c must add another 1/3 probability of being abnormal.

The heuristic that is precomputed and provided by the diagnosis engine 40 therefore allows prediction of total plan abnormality probability for a possible plan 54 that moves the system 20 through the state node sequence [S, A, C, G] or [S, A, D, G]. The lower bound of the total plan is 1/3, as determined by 1/3 from aS,A plus 0 from the completion aA,D, aD,G, and the upper bound is 3/3 equal to the sum of 1/3 from aS,A plus 1/3 each from aA,C and aC,G. If this plan is computed through [aA,C,aC,G] the total plan 54 will fail with probability 1, and therefore nothing is to be learned from constructing such a plan completion. If the plan 54 is instead completed through the suffix [aA,D,aD,G] the failure probability of the total plan will be 1/3 which is closer to the optimally informative probability T=0.5. In this case, the planner 30 will construct the plan 54 [S, A, D, G] for execution in the plant 20. The plan 54 may or may not succeed, and in either case something may be learned from a diagnostic perspective. For instance, if the plan [S, A, D, G] fails, the diagnosis engine 40 learns that node aS,A was the failed action (for the assumed single persistent fault scenario), and if the plan 54 is successful, the engine 40 can further refine the belief model 42 by eliminating action 404sa as a fault suspect, and instead using action 404sb.

It is noted that there is no guarantee that a plan 54 exists for any given value between the bounds. The diagnosis engine 40 recursively calculates the heuristic bounds starting from all goal states, where a goal state has an empty set of suffix plans $P_{G \to G} = \emptyset$ and therefore has a set lower bound $L_G = 0$ and a set upper bound $U_G = 0$. For each new state $S_m$, the diagnosis engine 40 calculates the corresponding bounds based at least partially on the bounds of all possible successor states $SUC(S_m)$ and the failure probability of the connecting action $a_{Sm,Sn}$ between $S_m$ and a successor state $S_n$. In this regard, a successor state $S_n$ of a state $S_m$ is any state that can be reached in a single step starting from the state $S_m$. In the case where a single fault is assumed, the failure probability added to a plan $p_{I \to S_m}$ by concatenating an action $a_{S_m, S_n}$ is independent from the plan $p_{I \to S_m}$ if $H_{PI \to S_m} \cap H_{aS_m S_n} = \emptyset$. The diagnosis engine 40 determines the lower bound for $S_m$ by the action probabilities linking $S_m$ to its immediate successors and the lower bounds on these successors, and the diagnosis engine 40 computes the upper bounds in analogous fashion with $L_{Sm} = \min_{Sn \in SUC(Sm)}[Pr(ab(a_{Sm,Sn})) + L_{Sn}]$, and $U_{Sm} = \max_{Sn \in SUC(Sm)}[Pr(ab(a_{Sm,Sn})) + U_{Sn}]$.

In contrast to the computation of the heuristic in the diagnosis engine 40, the search for an informative production plan by the planner 30 starts from the initial starting state S 402a and works recursively forward toward the goal state 402g. The abnormality probability of the empty plan starting at the initial state S is zero plus the best completion. In general, the planner 30 computes the abnormality probability as the plan probability up to the current state plus the abnormality probability of the best completion route. Since the planner 30 is initially uncertain about the completion, its probability of abnormality is an interval that includes a lower and upper bound and the values in between. As a result, the total abnormality probability is also an interval, as set forth in the following equation (7):

$$I(p_{I \to Sn}) = [Pr(ab(p_{I \to Sn})) + L_{Sn}, Pr(ab(p_{I \to Sn})) + U_{Sn}] \quad (7)$$

As noted above, the most informative plan 54 is one whose total failure probability is T, with T=0.5 in a preferred implementation for an assumed persistent single fault. Given an interval describing bounds on the total abnormality probability of a plan $I(p_{I \to S_n})$, the planner 30 can therefore construct an interval describing how close the abnormality probabilities will be to T according to the following equation (8):

$$|T - I(p_{I \to S_n})| \quad (8)$$

This absolute value in equation (8) folds the range around T, and if the estimated total abnormality probability of the plan 54 straddles target probability T, then the interval $|T-I(p_{I \to S_n})|$ straddles zero and the interval will range from zero to the absolute max of $I(p_{I \to S_n})$. The exemplary planner 30 uses a search heuristic $F(p_{I \to S_n}) = \min(|T - I(p_{I \to S_n})|)$ provided by the diagnosis engine 40 as part of the expected information gain data 70, although other heuristics are contemplated within the scope of the disclosure which allow target searching to construct plans 54 having high relative informative value. The exemplary function F has some advantageous properties. For example, whenever the predicted total plan abnormality probability lies between L and U, F is zero. Also, plans 54 may exist whose abnormality probability exactly achieves the target probability T. Moreover, in all cases $F(p_{I \to S_n})$ represents the closest any plan that goes through a state $S_n$ can come to the target abnormality probability exactly T.

The planner 30 can search from a whole set of partial plans $P = \{p_{I \to S_1}, p_{I \to S_2}, \ldots, p_{I \to S_n}\}$ (e.g., stored in the planner 30, the data store 36, or elsewhere in the system 2 or in an external data store accessible by the planner 30). For each partial plan, the planner 30 evaluates $F(p_{I \to S_n})$ and expands the plan with the lowest value. Since $F(p_{I \to S_n})$ is an underestimate, an A* search using this estimate will return the most informative plan that achieves production goals.

In a further aspect of the disclosure, the planner 30 may be operative to improve the efficiency of the target plan search using selective pruning. In this regard, the above described search heuristic in many cases may return the same value, i.e., zero, which provides the planner 30 with little guidance in making a selection. The planner 30 may accordingly be adapted to focus the search using one or more techniques. In a first focusing approach, the planner 30 prunes out dominated parts of the search space. For example, a given partial plan $I(p_{I \to S_n})$ may be identified by the planner 30 having an abnormality probability interval that does not straddle the target value T. The best possible plan in this interval will be on the one of the two boundaries of the interval that is closest to the target value T. For instance, let $L_I(p_{I \to S_n})$ and $U_I(p_{I \to S_n})$ be the lower and upper bound of the abnormality probability interval $I(p_{I \to S_n})$. The planner 30 determines the value of the best plan $V_{PI \to S_n}$ in such cases according to the following equation (9):

$$V_{PI \to S_n} = \min(|L_{I(PI \to S_n)} - T|, |U_{I(PI \to S_n)} - T|)$$

The plan $p_{I \to S_i}$ will dominate every plan $p_{I \to S_j}$ where $V_{PI \to S_i} < V_{PI \to S_j} \wedge T \notin I(p_{I \to S_j})$. The planner 30 accordingly operates to prune out (eliminate from further consideration) some or preferably all dominated plans from the A* search space.

In another aspect of the disclosure, the planner 30 may employ other focusing techniques to intelligently break ties in the heuristic value. As noted above, the heuristic value determines which state node will be expanded next, but it is possible that two or more nodes will receive the same heuristic value. Accordingly, the planner 30 may employ one or more rules to break the tie and hence to determine which node should be expanded first. One suitable rule in this regard is to simply pick a node randomly.

A further improvement can be implemented in the planner 30 according to this aspect of the disclosure, using the fact that $V_{PI \to S_n}$ (in equation (9) above) represents a guaranteed lower bound on a total plan $p_{I \to G}$ starting with the partial plan $p_{I \to S_n}$ as prefix. While the upper and lower bounds are realizable, none of the interior points of the interval are guaranteed to exist. Therefore, the planner 30 may advantageously compare the V's in order to decide which of two partial plans has the closest realizable solution to break the above mentioned ties. Moreover, if two partial plans are also identical in this parameter, the information gain is the same, and thus the planner 30 is operative to choose the partial plan that has less likelihood to fail, thereby facilitating short term productivity. The planner 30 is this embodiment may combine these two approaches in a sequential decision procedure. For example, if $p_{I \to S_1}$ and $p_{I \to S_2}$ are two partial plans with the same minimum value, i.e. $F(p_{I \to S_1}) = F(p_{I \to S_2})$, the planner 30 will break the tie by choosing the first rule that applies from the following ordered list:

1. If $V_{PI \to S_1} < V_{PI \to S_2}$ then expand $p_{I \to S_1}$ first;
2. If $V_{PI \to S_1} > V_{PI \to S_2}$ then expand $p_{I \to S_2}$ first;
3. If $U_I(p_{I \to S_1}) < U_I(p_{I \to S_2})$ then expand $p_{I \to S_1}$ first;
4. If $U_I(p_{I \to S_1}) > U_I(p_{I \to S_2})$ then expand $p_{I \to S_2}$ first;
5. If $L_I(p_{I \to S_1}) < L_I(p_{I \to S_2})$ then expand $p_{I \to S_2}$ first;
6. If $L_I(p_{I \to S_1}) > L_I(p_{I \to S_2})$ then expand $p_{I \to S_1}$ first;
7. otherwise pick randomly.

The planner 30 can also facilitate the selective avoidance of known faulty resources 21-24 in the plant 20 via the component 32b, as well as generation of plans 54 so as to help determine the source of faults observed during production. For example, the planner 30 operating the above described modular printing system plant 20 of FIG. 2 can be influenced by diagnostic objectives 34b (FIG. 3) to preferentially construct paper paths via appropriate routing of substrates to use different subsets of routing and printing components 24 and 22, where a given sequence of these paths can be used to isolate the cause of an observed fault. Moreover, multiple plant pathways, redundancy of plant resources, and the capability to operate resources at different speeds, voltage levels, temperatures, or other flexibility in setting operational parameters of the plant resources allows the planner 30 to tailor active production plan generation for intelligent diagnostic information gain despite lack of complete sensor coverage in a given plant 20. In this manner, the modularity and flexibility of a given system 20 can be exploited by the pervasive diagnostic features of the control system 2 to facilitate diagnostic objectives 34b while also providing benefits with regard to flexibility in achieving production goals.

The control system 2 can thus provide the advantages of performing diagnosis functions during production, even with limited sensor capabilities, with the flexibility to schedule dedicated diagnostic plans 54 if/when needed or highly informative. In the case of explicit dedicated diagnosis, the planner 30 focuses on the needs of the diagnosis engine 40 and thus creates/selects plans 54 that maximize information gain with respect to the fault hypotheses. The system 2 also allows the generation of plans 54 solely on the basis of production goals, for instance, where there is only one plan 54 that can perform a given production task and the planner 30 need not chose from a set of equivalent plans, thereby limiting the information gathering to the case of passive diagnosis for that plan.

In the exemplary modular printing system example 20 above, therefore, the control system 2 can choose to parallelize production to the extent possible, use specialized print engines 22 for specific printing tasks, and have the operational control to reroute sheet substrates around failed modules as these are identified. In this implementation, the planner 30 may receive a production print job 51 from a job queue (in the producer 10, or a queue in the planner 30), and one or more plans 54 are constructed as described above to implement the job 51. The observations 56 are provided to the diagnosis engine 40 upon execution of the plan(s) 54 to indicate whether the plan 54 succeeded without faults (e.g., not abnormal), or whether an abnormal fault was observed (e.g., bent corners and/or wrinkles detected by the sensors 26 in printed substrates). The diagnosis engine 30 updates the hypothesis probabilities of the belief model 42 based on the executed plan 54 and the observations 56. When a fault occurs, the planner 30 constructs the most informative plan 54 in subsequent scheduling so as to satisfy the diagnostic objectives 34b. In this regard, there may be a delay between submitting a plan 54 to the plant 20 and receiving the observations 56, and the planner 30 may accordingly plan production jobs 51 from the job queue without optimizing for information gain until the outcome is returned in order to maintain high short term productivity in the plant 20.

Using the above described pervasive diagnosis, the plan construction in the planner 30 is biased to have an outcome probability closest to the target T, and this bias can create paths capable of isolating faults in specific actions. Prior to detection of a system fault, the plant 20 may produce products 52 at a nominal rate $r_{nom}$, with diagnosis efforts beginning once some abnormal outcome is observed. The length of time required to diagnose a given fault in the system (e.g., to identify faulty plant components or resources 21-24) will be short if dedicated, explicit diagnostic plans 54 are selected, with pervasive diagnosis approaches taking somewhat longer, and passive diagnostic techniques taking much longer and possibly not being able to completely diagnose the problem(s). With regard to diagnosis cost, however, explicit dedicated diagnosis results in high production loss (production is halted), while purely passive diagnosis incurs the highest expected repair costs due to its lower quality diagnosis. The pervasive diagnosis aspects of the present disclosure advantageously integrate diagnostic objectives 34b into production planning by operation of the planner 30, and therefore facilitate realization of a lower minimal total expected production loss in comparison to passive and explicit diagnosis.

The passive diagnostic aspects of the disclosure, moreover, are generally applicable to a wide class of production manufacturing problems in which it is important to optimize efficiency but the cost of failure for any one job is low compared to stopping the production system to perform explicit diagnosis. In addition, the disclosure finds utility in association with non-manufacturing production systems, for example, service industry organizations can employ the pervasive diagnostic techniques in systems that produce services using machines, software, and/or human resources.

The invention claimed is:

1. A system for constructing plans for operating a production plant to achieve one or more production goals, the system comprising:
   at least one processor;
   a diagnosis engine implemented using the at least one processor and operative to:
      determine a current plant condition based at least partially on a previously executed plan, at least one corresponding observation from the plant, and a plant model of the plant,
      formulate a heuristic based on at least one diagnostic objective related to identifying resources of the plant causing intermittent or persistent faults, and to
      update a belief model representing the current state of the plant based at least partially on the previously executed plan, the at least one corresponding observation from the plant, and the plant model; and
   a planner implemented using the at least one processor and operatively coupled with the diagnosis engine to perform a partial-plan search using the heuristic to construct a plan for execution in the plant that will concurrently achieve at least one production goal and facilitate the at least one diagnostic objective;
wherein the diagnosis engine is operative to calculate plan failure probabilities based on action failure probabilities and the current plant condition, to formulate the heuristic based at least partially on the plan failure probabilities, and to provide information gain criterion to the planner for one or more possible plans based at least partially on the current plant condition and the plant model; and
wherein the planner uses the information gain criterion to construct the plan.

2. The system of claim 1, wherein the diagnosis engine is operative to derive failure probabilities for a plurality of fault hypothesis in the plant in formulating the heuristic based at least partially on the current plant condition.

3. The system of claim 2, wherein the diagnosis engine is operative to formulate the heuristic as a lower and upper plan failure probability bounding heuristic based at least partially on the current plant condition.

4. The system of claim 3, wherein the planner is operative to perform search space pruning to speed up the partial-plan search in constructing the plans.

5. The system of claim 3, wherein the planner is operative to evaluate partial plans according to the heuristic to preferentially construct informative plans based on the at least one diagnostic objective.

6. The system of claim 3, wherein the planner is operative to selectively construct plans with a plan failure probability closest to a target value T.

7. The system of claim 1, wherein the diagnosis engine is operative to formulate the heuristic as a lower and upper plan failure probability bounding heuristic based at least partially on the current plant condition.

8. The system of claim 7, wherein the planner is operative to perform search space pruning to speed up the partial-plan search in constructing the plans.

9. The system of claim 7, wherein the planner is operative to evaluate partial plans according to the heuristic to preferentially construct informative plans based on the at least one diagnostic objective.

10. The system of claim 7, wherein the planner is operative to selectively construct plans with a plan failure probability closest to a target value T.

11. The system of claim 1, wherein the planner is operative to evaluate partial plans according to the heuristic to preferentially construct informative plans based on the at least one diagnostic objective.

12. The system of claim 1, wherein the planner performs an A* partial-plan search using the heuristic to construct the plans.

13. A method of constructing plans for operating a production plant to achieve one or more production goals, the method comprising:
using at least one processor, determining a current plant condition based at least partially on a previously executed plan, at least one corresponding observation from the plant, and a plant model of the plant;
using the at least one processor, formulating a heuristic based on at least one diagnostic objective related to identifying resources of the plant causing intermittent or persistent faults;
using the at least one processor, updating a belief model representing the current state of the plant based at least partially on the previously executed plan, the at least one corresponding observation from the plant, and the plant model;
using the at least one processor, performing a partial-plan search using the heuristic;
using the at least one processor, constructing a plan for execution in the plant that will concurrently achieve at least one production goal and facilitate the at least one diagnostic objective based on the partial-plan search;
using the at least one processor, calculating plan failure probabilities based on action failure probabilities and the current plant condition;
using the at least one processor, generating information gain criterion for one or more possible plans based at least partially on the current plant condition and the plant model;
wherein the at least one processor formulates the heuristic based at least partially on the plan failure probabilities; and
wherein the at least one processor constructs the plan using the information gain criterion.

14. The method of claim 13, wherein formulating the heuristic comprises deriving failure probabilities for a plurality of fault hypothesis in the plant based at least partially on the current plant condition.

15. The method of claim 13, wherein the heuristic is formulated as a lower and upper plan failure probability bounding heuristic.

16. The method of claim 13, further comprising performing search space pruning to speed up the partial-plan search in constructing the plans.

17. The method of claim 13, wherein performing the partial-plan search comprises evaluating partial plans according to the heuristic to preferentially construct informative plans based on the at least one diagnostic objective.

18. A non-transitory computer readable medium having computer executable instructions for performing the steps of:
determining a current plant condition based at least partially on a previously executed plan, at least one corresponding observation from the plant, and a plant model of the plant;
formulating a heuristic based on at least one diagnostic objective related to identifying resources of the plant causing intermittent or persistent faults;
performing a partial-plan search using the heuristic;
updating a belief model representing the current state of the plant based at least partially on the previously executed plan, the at least one corresponding observation from the plant, and the plant model;
constructing a plan for execution in the plant that will concurrently achieve at least one production goal and facilitate the at least one diagnostic objective based on the partial-plan search;
calculating plan failure probabilities based on action failure probabilities and the current plant condition; and
generating information gain criterion for one or more possible plans based at least partially on the current plant condition and the plant model;
wherein the heuristic is formulated based at least partially on the plan failure probabilities; and
wherein the plan is constructed using the information gain criterion.

19. The system of claim 1, wherein the diagnosis engine performs the partial-plan search using the at least one diagnostic objective and a current state of a partial plan.

20. The system of claim 1, wherein the diagnosis engine formulates the heuristic at least partially based on the current plant condition.

* * * * *